(12) United States Patent
Shen

(10) Patent No.: US 8,047,143 B2
(45) Date of Patent: Nov. 1, 2011

(54) APPARATUS FOR INCINERATING WASTE AND PROCESS FOR COMPREHENSIVE UTILIZATION OF WASTE

(76) Inventor: Fuchang Shen, Changzhou (CN)

( * ) Notice: Subject to any disclaimer, the term of this patent is extended or adjusted under 35 U.S.C. 154(b) by 699 days.

(21) Appl. No.: 11/720,676

(22) PCT Filed: Dec. 19, 2005

(86) PCT No.: PCT/CN2005/002235
§ 371 (c)(1),
(2), (4) Date: Aug. 14, 2008

(87) PCT Pub. No.: WO2007/068149
PCT Pub. Date: Jun. 21, 2007

(65) Prior Publication Data
US 2009/0031930 A1    Feb. 5, 2009

(51) Int. Cl.
*F23K 3/02* (2006.01)
*F23J 15/00* (2006.01)

(52) U.S. Cl. .................. 110/101 R; 110/203

(58) Field of Classification Search .......... 110/238, 110/215; 55/428, 430, 431
See application file for complete search history.

(56) References Cited

U.S. PATENT DOCUMENTS

| | | | |
|---|---|---|---|
| 3,863,606 A * | 2/1975 | Bryers et al. .............. | 110/264 |
| 4,620,492 A | 11/1986 | Vogg et al. | |
| 4,811,555 A | 3/1989 | Bell | |
| 4,901,654 A | 2/1990 | Albertson et al. | |
| 4,917,027 A * | 4/1990 | Albertson et al. ............. | 110/346 |
| 4,982,672 A | 1/1991 | Bell | |
| 5,534,659 A * | 7/1996 | Springer et al. .............. | 110/346 |
| 5,724,901 A * | 3/1998 | Guy et al. ...................... | 110/346 |
| 6,971,323 B2 * | 12/2005 | Capote et al. ................. | 110/250 |

* cited by examiner

Primary Examiner — Kenneth Rinehart
Assistant Examiner — David J Laux
(74) Attorney, Agent, or Firm — Morris Manning Martin LLP; Tim Tingkang Xia, Esq.

(57) ABSTRACT

The present invention relates to apparatus for incinerating dangerous waste, and in particular, apparatus for incinerating dangerous waste in various forms. It comprises a continuous feeding device, an incineration furnace, a flue gas quenching device, a flue gas treating device, and an online monitoring system. The continuous feeding device includes device for feeding paste, powder, and solid device. The quenching device is connected to a steam boiler and a thermal oil tank, thus achieving comprehensive utilization of the thermal energy generated during incineration of the waste. Apparatus for incinerating dangerous waste according to the present invention enables sufficient combustion of the waste, recycling of the metal oxides or noble metals from the combustion flue gas and/or sinters and/or furnace ashes, effective elimination of the concurrent degradation and re-forming of dioxins. In addition, users can purchase one set of the apparatus for incinerating dangerous waste of the present invention for treating various forms of waste, thus substantially reducing the related capital cost.

19 Claims, 2 Drawing Sheets

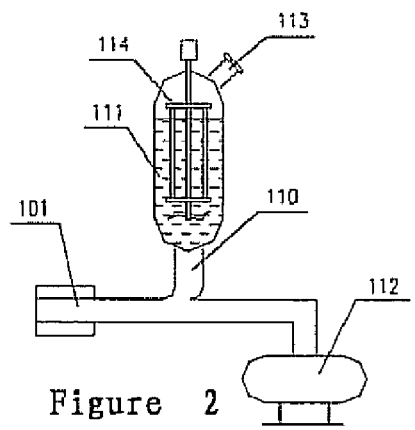
Figure 2
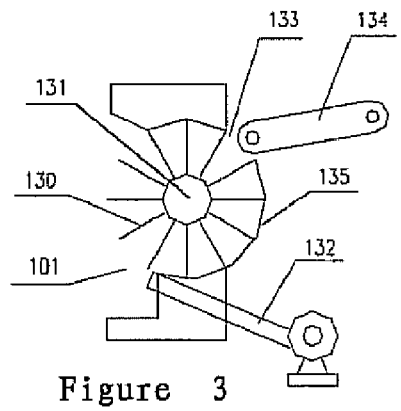
Figure 3
In direction B
Figure 4
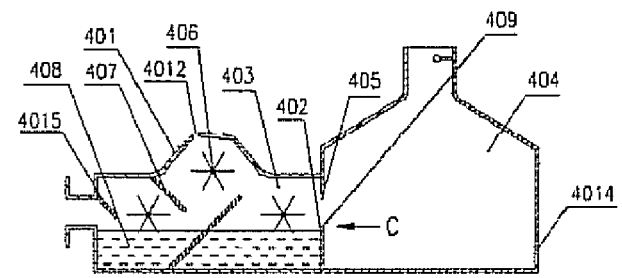
Figure 5
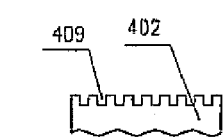
In direction C
Figure 6
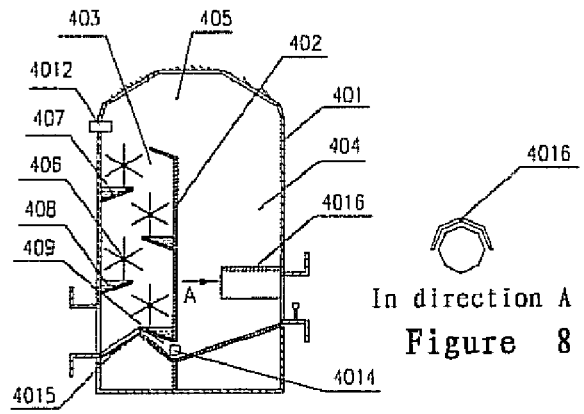
Figure 7
In direction A
Figure 8
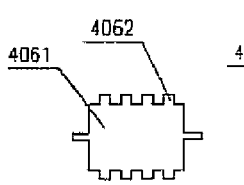
Figure 9
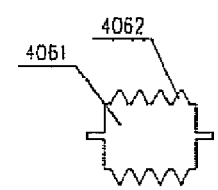
Figure 10
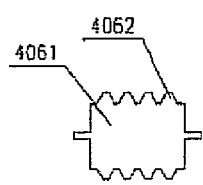
Figure 11
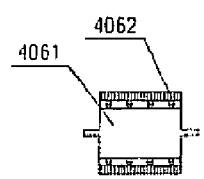
Figure 12

APPARATUS FOR INCINERATING WASTE AND PROCESS FOR COMPREHENSIVE UTILIZATION OF WASTE

REFERENCE TO RELATED APPLICATIONS

This application is the U.S. national phase of PCT/CN051002235, filed Dec. 19, 2005, which claims priority from Chinese application No. 200510123076.4, filed Dec. 15, 2005, the entire content of both of which are incorporated herein by reference.

FIELD OF THE INVENTION

The present invention relates to apparatus for incinerating waste, and in particular, to apparatus for incinerating dangerous waste in various forms, and also a process for comprehensive utilization of waste.

BACKGROUND OF THE INVENTION

Various types of industrial waste, such as chemical residues from chemical plants, wood dust containing substantial amount of formaldehyde and other poisonous raw chemical materials from mills for producing compound floors, fiber plate, synthetic plate etc., and medical waste from medical facilities, if not treated duly, would require space for storing them, and at the same time would cause very serious environmental pollution. Conventional processes for treating waste mainly comprises incineration and landfill. Since some poisonous chemicals contained in waste have a high burning point, however, they usually fail to decompose during the incineration process owing to incomplete combustion and thus remain in ashes or dusts. As a result, they cause environmental pollution and pose a serious threat to human health.

Moreover, most industrial waste often contain catalysts, including metals, metal oxides, or metal chlorides. When such waste is incinerated to decompose the poisons, the metals, metal oxides, or metal chlorides contained therein generally react with organics. Thus, the flue gas from the incineration process will contain poisons, including dusts, dioxins, and the like. These poisons flow with the flue gas and diffuse into the atmosphere. They invade the human body through skin, respiratory and tracts, and are carried into the human body by agriculture crops, thus posing a serious threat to human health.

In addition, dioxins are formed above 200° C. and degraded completely at 800° C.; however, it is re-formed at 200-400° C. Thus, when waste, such as chemical residues, medical waste, wood dust containing poisonous chemicals, etc. are incinerated, they must be incinerated in an incineration furnace to a full extent: they are subjected to a high-temperature incineration at a temperature of 1100-1300° C., so as to achieve a complete decomposition of the poisonous chemicals, in particular, dioxins contained in the waste. In order to avoid re-formation of dioxins at 200-400° C. in the high-temperature flue gas, the latter, at above 600° C., must be quenched to below 200° C. within one second so as to prevent re-forming of dioxins, and it must be cleaned for safe exhausting, as prescribed by some regulations concerning environmental protections.

With the increasingly stricter requirements of environmental protection regulations worldwide, extensive research has been carried out on processes and apparatus for treating waste, such as chemical residues, medical waste, wood dust and the like. For example, a device comprising a furnace for treating medical waste has been developed in Japan, wherein the medical waste is picked up by manipulators and then fed into the furnace hearth after the furnace door provided on the body is opened. Since the door must be opened when the waste is fed, the hearth temperature suffers a transient decrease, and thus cannot achieve the combustion temperature required by environmental protection regulations in a short period, which negatively affects incineration performance. Furthermore, since waste has various forms, such as liquid, particles, solid, etc., various processes and devices are necessary, depending upon the forms of the waste to be treated. Large capital investments on the part of enterprises, therefore, are required in apparatus for treating waste in various forms.

SUMMARY OF THE INVENTION

In order to overcome the disadvantages of the prior art, it is an object of the present invention to provide apparatus for incinerating dangerous waste, capable of completely incinerating waste in various forms at high temperature into a high-temperature flue gas; the flue gas is then quenched and recovered and cleaned to be an exhaust gas which does not pollute the environment. Thus, the waste can be made valuable, and the thermal energy generated during the incineration of waste can be utilized on a comprehensive basis.

The technical problem is solved through the following technical solution: apparatus for incinerating dangerous waste, comprising a continuous feeding device, an incineration furnace, a thermal energy recovery system, a flue gas quenching device, a flue gas treating device, and an online monitoring system, the discharging outlet of the continuous feeding device being connected to the feeding inlet of the incineration furnace; the flue gas outlet of the furnace being connected to the inlet of a steam boiler or a thermal oil boiler; an induced draft fan being provided above the flue gas outlet; the outlet of the steam boiler or the thermal oil boiler being connected to the inlet of the flue gas quenching device; the flue gas outlet of the flue gas quenching device being connected to the inlet of the flue gas treating device; the online monitoring system being used to monitor on a real-time basis the temperatures of the incineration furnace, the thermal energy recovery system, and the flue gas treating device, and also to monitor whether the gas exhausted from the flue gas treating device meets the environmental protection requirements or not.

The continuous feeding device according to the present invention has a structure as follows: it has a pipeline with one end connected to the furnace and the other end connected to an gas-feeding component; and a feeding hopper provided above the pipeline, having a feeding component inside itself and a discharging outlet connected to the pipeline at its bottom. Generally, a gas-feeder is used as the gas-feeding component and a stirrer or a vibrator as the feeding component. Various feeding device can be chosen depending on the states of the waste, for example, a device for feeding liquid, particulate, or solid waste. All these feeding devices for waste of three different states can have outlets with the same profiles.

Said device for feeding liquid waste has a feed bin with a feeding inlet, a discharging outlet, and inside the feed bin a feeding component, preferably, a stirrer. An air compressor is provided on the pipeline to the discharging outlet. Some hard-to-flow waste, which can be liquefied or melted through heating, may be converted into flowable mass through jacket heating and then fed through a feeding device. Thus, the incineration process can be simplified through dispensing with drying and crushing. Furthermore, environmental pollution is reduced owing to decreased amount of dust generated during drying and crushing.

Said device for feeding particulate waste has a pipeline with one end provided with a discharging outlet and the other end connected to an gas-feeding component, a feeding hopper provided above the pipeline, having a feeding component, preferably, a stirrer or a vibrator inside itself and connected to the pipeline.

Said device for feeding solid waste has a discharging outlet, a circular impeller feeder which is installed inside the discharging outlet and can rotate clockwise, a pneumatic propeller, a feeding inlet, and a belt conveyer. A feed baffle is provided below the circular impeller feeder. The internal space at the discharging outlet and the shape of the feed baffle match with that of the circular impeller feeder, thus preventing the thermal energy inside the furnace from diffusing outward and the waste to be incinerated from leaking. The pneumatic propeller is provided below the feed baffle. The waste to be incinerated is passed from the feeding inlet via the belt conveyer to the circular impeller feeder which rotates, and then injected into the furnace hearth by the pneumatic propeller. In order to inject the waste to be incinerated into the furnace hearth more completely and prevent the waste from falling onto the bottom of the furnace hearth directly, feeding terraces are provided against the internal furnace wall at both the feeding inlet and the inlet of pneumatic propeller.

Chemical waste or wood dusts are dumped into the feeding hopper before the stirrer or the vibrator is started. Then, the chemical waste or the wood dusts in the feeding hopper are introduced into pipeline 1 under stirring or vibrating, while gas is fed into the pipeline by the gas-feeding component to blow the waste into the furnace hearth in a spray or a boiling form. Thus, the waste can be contacted with hot gas sufficiently, and distributed uniformly in the furnace hearth and combusted completely therein. Furthermore, the temperature of the furnace wall at the feeding inlet can be decreased by the cool gas blown from the gas-feeding component to effectively prevent the waste from sintering at the feeding inlet which might otherwise negatively affect normal feeding and to prevent the furnace wall from deforming or aging due to the high temperature in the furnace hearth. The feeding rate can also be adjusted through adjustments of the vibrating rate or stirring rate of the feeding component and the amount of the fed gas, depending on the requirements for the furnace temperature and in response to the monitoring results obtained from the monitor, so as to ensure that the combustion temperature in the incineration furnace can meet the requirements of environmental protection regulations.

The incineration furnace according to the present invention has the following structure: it comprises a furnace body, a partition wall vertically displaced in the furnace body dividing the furnace hearth into a combustion region and a ventilation region, a passage provided above the partition wall between the combustion region and the ventilation region, flue gas guiding means installed between the internal wall of the furnace and the partition in the combustion region, which consists of components horizontally extended and vertically staggered from each other, a feed spout provided below the flue gas guiding means in the furnace, a flue gas outlet in the furnace in the ventilation region, a grate and a gas inlet of the furnace body provided below the combustion region, and an automatic ash-purging device 209 consisting of belt pulley wheel mechanisms on the bottom of incineration furnace 20.

The high temperature flue gas ascends in an "S"-shaped way guided by the flue gas guiding means, significantly elongating the combustion route of the waste in the incineration furnace and achieving an effective combination of suspension and layer combustions. Thus, a relatively high combustion temperature can be achieved for the waste in the combustion region of the furnace hearth, even as high as 1100-1300° C., ensuring sufficient combustion and complete degradation of the waste in the incineration furnace. Preferably, the flue gas guiding means consisting of multiple components at different levels, more preferably components at three levels; for instance, the upper and the lower components extend from the partition wall, and the middle component extends from the furnace body. The flue gas guiding means preferably assumes an arc shape, so as to facilitate sliding and falling of the sinters generated during the suspension combustion of the waste. The arc has an angle of 10-80°, preferably 15-75°, more preferably 20-65°, and most preferably 25-60°.

Preferably, an oil spout is provided below the flue gas guiding means in the furnace body and is inclined downward. More preferably, the central axis of the oil spout and the horizontal line form an angle of 10-80°, more preferably 15-75°, further preferably 20-65°, and most preferably 25-60° C. Thus, the combustion temperature in the furnace hearth can be increased rapidly to meet the requirements of environmental protection regulations through adding oil to promote combustion at the start of the incineration or when the combustion temperature in the furnace hearth is lower than that required for sufficient combustion due to the incineration of waste having low heat capacity. Furthermore, this configuration can assure that the poisonous chemicals in the waste can be decomposed into nontoxic and odorless high temperature flue gas free of environmental pollution. It can also assure the complete degradation of dioxins.

The high temperature flue gas is directed to a steam boiler or a thermal oil tank via the flue gas outlet of the incineration furnace. Thus, the thermal energy released by the high temperature flue gas can be used sufficiently or be converted into other useful energies (such as electrical energy, and mechanical energy). In this way, waste can be utilized and thus turned into usable material.

The advantageous effects of the incineration furnace according to the present invention are as follows. The waste is blown into the furnace hearth in a foggy or a boiling form by the feeding device. Thus, the waste can be contacted with hot gas sufficiently, and distributed uniformly in the furnace hearth and combusted completely therein. The combustion ratio of the waste can achieve as high as 95-97% and the combustion temperature in the incineration furnace can reach as high as 1100-1300° C. Thus, the poisonous chemicals can be decomposed at a high temperature into nontoxic and odorless flue gas free of environmental pollution before exiting and dioxins can be degraded completely. Furthermore, the thermal energy of the high temperature flue gas generated during the incineration can be utilized comprehensively, for example, 1 ton purified p-phthalic acid residues is incinerated to produce thermal energy corresponding to that produced from combusting 1.3-1.5 tons coals. Thus, the waste is turned into usable material. When the combustion temperature in the furnace hearth cannot meet the requirements of environmental protection regulations, it can be increased rapidly to meet the requirements by adding oil through the oil spout to promote combustion. Thus, the poisonous chemicals in the waste can be decomposed into nontoxic and odorless high temperature flue gas free of environmental pollution and dioxins can be degraded completely.

The flue gas quenching device has a flue gas inlet and a flue gas outlet. It is connected to a steam boiler or a thermal oil tank. The flue gas outlet of the quenching device is connected to the flue gas inlet of the flue gas treating device. Said quenching device has a quenching barrel with a flue gas inlet at one end and a flue gas outlet at the other end. The quenching barrel is divided into two segments, namely the first quenching segment wherein at least two serpentuators containing a cooling medium, preferably thermal oil or steam are provided in parallel, and the second quenching segment wherein at least two straight tubes containing a cooling medium, preferably water are provided in parallel. In the first quenching segment, the serpentuator is provided with an inlet and an outlet for the cooling medium, wherein the outlet is also connected to the thermal oil tank or the steam boiler. In the second quenching segment, the straight tube is provided with an inlet and an outlet for the cooling medium, wherein the outlet is also connected to the steam boiler. The flow rate of the cooling medium is controlled depending on the monitoring results obtained from the online monitoring system to achieve sufficient heat exchange between the high temperature flue gas and the cooling medium in the quenching barrel. Thus, the high temperature flue gas is cooled below the re-forming temperature of dioxins within one second to prevent re-forming of dioxins effectively.

Said flue gas treating device has a gas-tight shell, wherein a partition wall dividing the shell chamber into a flue gas purification region and a liquid-gas separation region is provided. A passage for conveying flue gas between the flue gas purification region and the liquid-gas separation region is provided above the partition wall. The shell is provided with a gas inlet and a liquid inlet in the flue gas purification region, a gas outlet in the liquid-gas separation region, and a liquid outlet on the bottom of the shell. On the internal wall of the shell, a gas flow baffle is provided at the gas inlet. An impeller and a gas flow guide plate are fixed in the flue gas purification region. The gas flow guide plate and baffle are both displaced in an inclined manner with the inclination direction coinciding with the gas flow direction and the inclination angle being 10°-80°, more preferably 15°-75°, further preferably 20'-65°, most preferably 25°-60°. The number of impellers is not less than one, with each impeller having at least one vane. The vane is provided with teeth, which can be zigzag, triangular or trapezoidal teeth unitary with the vane, or can be threads, or plastic ropes fixed on the vane. The tooth height is 1-200 mm, preferably 5-185 mm, more preferably 10-170 mm, further preferably 15-165 mm, and most preferably 20-160 mm. Purifying liquor is provided below the impeller. Said purifying liquor is selected from the group consisting of water, basic liquor, and acidic liquor, depending on the physical and chemical properties of the waste actually treated. To ensure an effective contact between the vane and the purifying liquor, the liquor should be maintain at such a level that it contacts 1-200 mm, preferably 5-185 mm, more preferably 10-170 mm, still more preferably 15-165 mm, and most preferably 20-160 mm of the vane. An overflow passage is also provided between the flue gas purification region and the liquid-gas separation region to facilitate timely discharge and renewal of the purifying liquor. The gas outlet of the treating device should be located on the upper part of the shell in the liquid-gas separation region to facilitate smooth exhausting of the purified flue gas in the liquid-gas separation region from the shell. Furthermore, the length of the treating device, the number of vanes, and the number and the size of the flow baffle, the flow guide plate, the flue gas purification region, and the flue gas separation region in the treating device can be adjusted depending on various factors, such as the flow rate of the flue gas, the special structure and position, and the like to assure that the purification process of the flue gas meets or exceeds the requirements of environmental protection regulations.

Said flue gas treating device is any one selected from the group consisting of the horizontal structure shown in FIG. 1, the arched structure shown in FIG. 5, and the vertical structure shown in FIG. 7 or any variation or combination thereof. If the gas outlet is necessarily displaced on the lower part of the shell in the liquid-gas separation region due to structure requirements, an arched covering plate is needed to be provided above the gas outlet to prevent the settled purified liquid from being pushed out of the gas outlet by the exhausted gas flow.

The working process according to the present invention is as follows. Ignition is assisted by providing a detonator on the grate and further by starting the induced draft fan. An appropriate continuous feeding device is chosen depending on the forms of the waste to be treated. The chemical waste or the wood dust in the feeding hopper is introduced into the pipeline under stirring or vibrating, while gas is fed into the pipeline by the gas-feeding component to blow the waste into the furnace hearth in a foggy or a boiling form. Thus, the waste can be distributed uniformly in the furnace hearth and contacted with hot gas sufficiently to ensure sufficient combustion of the waste. The combustion ratio of the waste can achieve as high as 95-97% and the combustion temperature can reach as high as 1100-1300° C. to promote complete degradation of dioxins. Furthermore, the temperature of the furnace wall at the feeding inlet can be decreased by the cool gas blown from the gas feeder to prevent the furnace wall from deforming or aging due to heating applied by the high temperature in the furnace hearth, particularly to prevent the high temperature which would otherwise easily occur at the feeding inlet which might affect normal feeding. The feeding amount and rate can be adjusted through controlling the vibrating rate and the stirring rate of the feeding component and the amount of the fed gas, depending on the requirements for the furnace temperature and the online monitoring results obtained from the monitor to assure that the waste is subjected to sufficient combustion at high temperature (1100-1300° C.) in the incineration furnace and the poisons contained in the waste are sufficiently decomposed. Furthermore, metal oxides and noble metals can be recovered and extracted from the sinters obtained from the combustion of the waste. Thus, the waste will no longer pollute the environment, and the thermal energy can be utilized comprehensively. In addition, the high temperature flue gas ascends in an "S"-shaped way under the guide of the flue gas guiding means to significantly elongate the combustion route of the waste and to achieve sufficient suspension and layer combustions of the waste. Thus, the waste is turned into nontoxic and odorless sinters and high temperature flue gas free of environmental pollution. Furthermore, the combustion temperature in the furnace hearth can be increased to ensure sufficient combustion of the waste in the incineration furnace through injecting oil into the furnace hearth via the oil spout to promote combustion at the ignition stage or when the combustion temperature in the furnace hearth cannot meet the requirements of environmental protection regulations due to the incineration of waste having low heat capacity. In addition, the high temperature flue gas is quenched by the quenching device before being exhausted via the flue gas outlet. Thus, it can be cooled below 200° C. within one second to prevent reforming of dioxins in the high temperature flue gas effectively. At the same time, the flue gas is recovered and freed of harmful substances and dusts contained therein by the treating device. It is thereby purified to meet the requirements of environmental protection regulations before being exhausted. The gas exhausted from the gas outlet is monitored in an online manner by the online monitoring system installed at the gas outlet of the treating device to determine whether it meets the requirements of environmental protection regulations or not.

The advantageous effects of the present invention are as follows. An appropriate continuous feeding device is chosen depending on the forms of the waste to be treated, and the waste to be incinerated is fed into the incineration furnace continuously by the continuous feeding device. The feeding process will not cause decreased temperature in the furnace hearth and the waste is combusted in a boiling state and a layer manner in the incineration furnace. The combustion temperature in the furnace hearth can be increased rapidly by injecting oil into the furnace hearth through the oil spout to promote combustion. Thus, the temperature in the two combustion chambers of the incineration furnace achieves 1100-1300° C. to ensure sufficient combustion of the waste in the incineration furnace with the combustion ratio of the waste being as high as 95-97%. Thereby, the harmful substances contained in the waste can be decomposed through sufficient combustion. The thermal energy generated by the exhausted high temperature flue gas can be utilized sufficiently or be converted into other useful forms of energy. Furthermore, metal oxides and noble metals can be extracted and recovered from the furnace ashes remaining after combustion of waste and from the treating liquor in the treating device. The high temperature flue gas can be quenched below 200° C. within one second by the quenching device to prevent re-forming of dioxins in the high temperature flue gas. After the high temperature flue gas is quenched by the quenching device, it is then purified by removing harmful substances and dust contained therein through the treating device before being exhausted. The online monitoring system monitors the temperature in the incineration furnace with continuous feeding and in the quenching device and determines whether the flue gas exhausted from the treating device meets the requirements of environmental protection regulations or not. In addition, the users can change the corresponding continuous feeding device depending on the forms of the waste to be treated. Thereby, several forms of waste can be treated without purchasing several sets of devices. Thus, capital costs are saved for the users.

It is another object of the present invention to provide a process for treating and comprehensively utilizing die waste, comprising: combusting the waste sufficiently using the device for incinerating dangerous waste according to the present invention, recovering the thermal energy from the high temperature flue gas or converting it into other useful forms of energy, and recovering the metal oxides or noble metals from the treated flue gas and/or sinters. Said dangerous waste are selected from the group consisting of liquid waste, solid waste or particulate waste; preferably selected from the group consisting of industrial waste, medical waste, wood dust or agricultural waste.

BRIEF DESCRIPTION OF THE DRAWINGS

The present invention is now further described with reference to the drawings and the examples.

FIG. 2 is a schematic view of the device for feeding paste waste according to the present invention.

FIG. 3 is a schematic view of the device for feeding solid waste according to the present invention.

FIG. 4 is a view in direction B of the overflow passage shown in FIG. 1.

FIG. 5 is a schematic view of the flue gas treating device according to the second embodiment.

FIG. 6 is a view in direction C of the overflow passage shown in FIG. 5.

FIG. 7 is a schematic view of the present flue gas treating device according to the third embodiment.

FIG. 8 is a view in direction A of the arched covering plate shown in FIG. 7.

FIG. 9 is a schematic view of the vane according to the first embodiment.

FIG. 10 is a schematic view of the vane according to the second embodiment.

FIG. 11 is a schematic view of the vane according to the third embodiment.

FIG. 12 is a schematic view of the vane according to the fourth embodiment.

Figure 1:
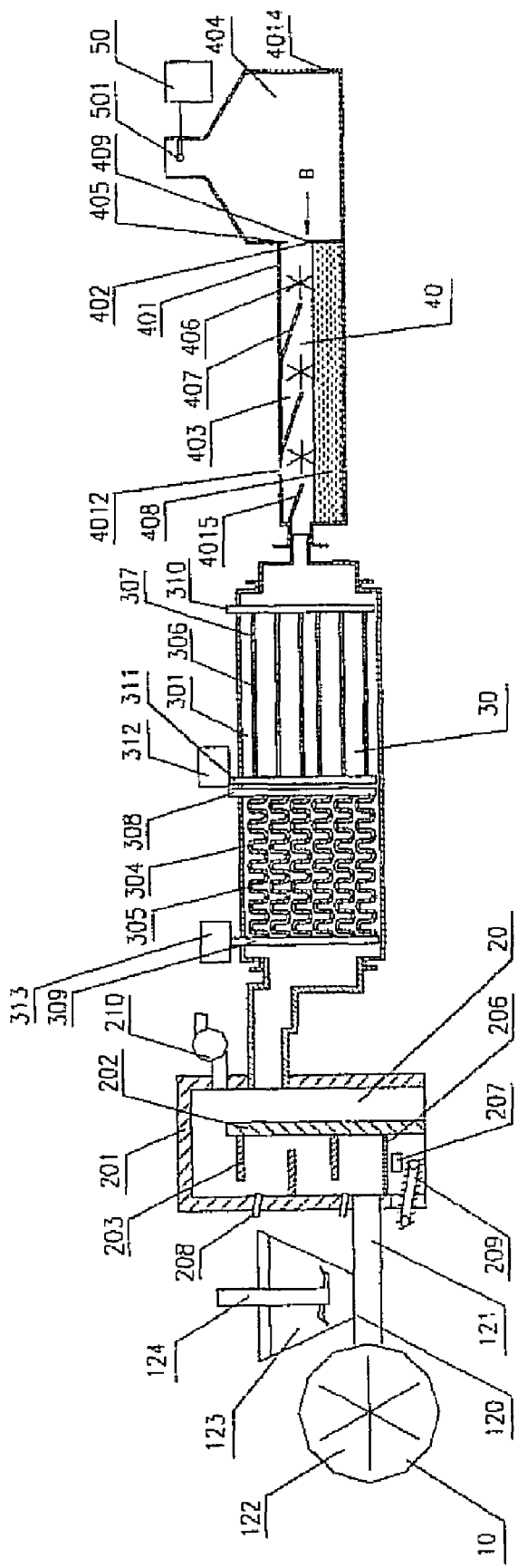
FIG. 1 is a schematic view of the apparatus for incinerating dangerous waste according to an example of the present invention.

Legends of the reference signs: 10—continuous feeding device, 101—discharging outlet, 110—device for feeding liquid waste, 111—feed bin, 112—gas feeder, 113—feeding inlet, 114—feeding component, 120—device for feeding particulate waste, 121—pipeline, 122—gas-feeding component, 123—feeding hopper, 124—feeding component, 130—device for feeding solid waste, 131—circular impeller feeder, 132—pneumatic propeller, 133—feeding inlet, 134—belt conveyer, 135—feed baffle, 20—incineration furnace, 201—furnace body, 202—partition wall, 203—flue gas guiding means, 206—grate, 207—gas inlet, 208—oil spout, 209—automatic ash-purging device, 210—induced draft fan, 30—flue gas quenching device, 301—quenching barrel, 304—serpentuator, 305—cooling medium, 306—straight tube, 307—cooling medium, 308—inlet, 309—outlet, 310—inlet, 311—outlet, 312—steam boiler, 313—thermal oil tank, 40—flue gas treating device, 401—shell, 4012—liquid inlet, 4014—liquid outlet, 4015—gas baffle, 4016—arched covering plate, 402—partition wall, 403—flue gas purification region, 404—liquid-gas separation region, 450—flue gas passage, 406—impeller, 4061—vane, 4062—teeth, 407—gas guiding plate, 408—purifying liquor, 409—overflow passage, 50—online monitoring system, 501—monitor.

DETAILED DESCRIPTION OF THE INVENTION

As used herein, "quenching device" shall mean a heat exchanger with heat exchange tubes.

The apparatus for incinerating dangerous waste according to an example of the present invention as shown in FIG. 1 comprises: a continuous feeding device 10, an incineration furnace 20, a flue gas quenching device 30, a flue gas treating device 40, and an online monitoring system 50. The continuous feeding device 10 is a device for feeding particulate waste 120 and has a pipeline 121 with one end provided with a waste outlet and the other end connected to a gas-feeding component 122, herein a gas feeder. A feeding hopper 123 is provided above and connected to the pipeline 121 and has in itself a feeding component 124, herein a stirrer or a vibrator. Particulate waste (such as chemical waste or wood dust) is dumped into the feeding hopper 123 before the stirrer or the vibrator 124 is started. Then, the chemical waste or the wood dust in the feeding hopper 123 automatically flow into the pipeline 121 under stirring of the stirrer 124 or vibrating of the vibrator 124. Gas is fed into the pipeline 121 by the gas feeder 122. Thus, the chemical waste or the wood dust flowing into the pipeline 121 from the feeding hopper 123 are blown into the furnace hearth in a foggy or a boiling form under pneumatic action. When stirring or vibrating is stopped, the chemical waste or the wood dust and the like in the feeding hopper 123 thereby will not flow into the pipeline 121. The amount of the fed waste is adjusted through controlling the vibrating and stirring rate based on the requirements for furnace temperature. Furthermore, the temperature of the furnace wall at the feeding inlet of the incineration furnace 20 can be decreased by the cool gas blown from the gas feeder 122. The device for feeding powder waste 10 has a discharging outlet connected to the feeding inlet of the incineration furnace 20. The incineration furnace 20 has a furnace body 201 with a vertically displaced partition wall 202 dividing the furnace hearth into a combustion region and a ventilation region. A passage is provided above the partition wall 202 between the combustion region and the ventilation region. A flue gas guiding means 203 consists of three components horizontally extending from the partition wall 202 on the combustion region side and the internal wall of the furnace body 201. The components are vertically staggered relative to each other, with the upper and the lower components extending from the partition wall 202, and the middle layer extending from the internal wall of the furnace body 201. A feeding inlet is provided below the flue gas guiding means 203 in the furnace body 201. A flue gas outlet is provided in the ventilation region of the furnace body 201. An induced draft fan 210 is provided above the flue gas outlet. A movable grate 206 is provided below the combustion region, and a gas inlet 207 is provided below the movable grate 206 in the lower portion of the furnace body 201. Three oil spouts 208 are respectively located above the feeding inlet, and below and above the flue gas guiding means 203 in the combustion region of the furnace body 201. Each spout 208 is inclined downward with its central axis forming an angle of 5-20° with the horizontal line. An automatic ash-purging device 209 consisting of belt pulley wheel mechanisms is provided on the bottom of incineration furnace 20. Ignition is assisted by providing a detonator on the grate 206 and by starting the induced draft fan 210, and is promoted by the gas supplied through the gas inlet 207 below. Waste is continuously fed into the furnace hearth by the continuous feeding device 10 and subjected to high temperature combustion therein to give out high temperature flue gas. The high temperature flue gas ascends in an "S"-shaped way under the guidance of the flue gas guiding means 203. Thus, suspension and layer combustions are achieved at high temperature to obtain a high combustion temperature in the combustion region of the furnace hearth. The sinters generated during this sufficient combustion are removed from the movable grate 206.

At the early stage of the combustion, the combustion temperature in the furnace hearth cannot meet the requirements of environmental protection regulations. A similar situation occurs when the waste under incineration has low heat capacity. In that event, oil is injected into the furnace hearth via the oil spout 208, thus promoting combustion in the incineration furnace 20 and thus increasing the combustion temperature in the furnace hearth. Thus, the harmful substances contained in the waste undergo sufficient combustion and complete decomposition, giving out nontoxic and odorless high temperature flue gas free of environmental pollution. After the high temperature flue gas is treated for recovery of thermal energy, it is freed of dust and harmful substances to meet the requirements of environmental protection regulations before being exhausted. At the same time, metal oxides or noble metals are recovered from the sinters or the furnace ashes. The flue gas quenching device 30 has a quenching barrel 301 with a flue gas inlet at one end connected to the flue gas outlet of the incineration furnace 20 and a flue gas outlet at the other end. The quenching barrel 301 is divided into two segments, namely the first quenching segment 301 wherein several serpentuators 304 containing cooling medium 305, thermal oil or steam, are provided in parallel, and the second quenching segment 301 wherein several straight tubes 306 containing cooling medium 307, water, are provided in parallel. In the first quenching segment, the serpentuator is provided with an inlet 308 and an outlet 309 for the cooling medium 305, with the outlet 309 connected to the thermal oil tank or the steam boiler 313. In the second quenching segment, the straight tubes 306 are provided with an inlet 310 and an outlet 311 for the cooling medium 307, with outlet 311 connected to the steam boiler 312.

In order to ensure that the dioxins contained in the high temperature flue gas exhausted from the incineration furnace are in a decomposed state, the high temperature flue gas enters the quenching barrel 301 via the flue gas inlet and passes through the quenching barrel 301 at a desirable flow rate. The thermal oil 305 is introduced into the serpentuators 304 via the inlet 308 and then exits via the outlet 309, with the thermal oil 305 and the high temperature flue gas flowing in opposite directions. In this way, the thermal oil 305 undergoes rapid heat exchange in the serpentuators 304 with the high temperature flue gas in the first quenching segment, promoting rapid cooling of the high temperature flue gas. Thus, the thermal oil 305 is heated to 250° C. and flows into the thermal oil tank via the outlet 309 for utilizing the thermal energy contained therein directly or converting it into other forms of energy. The flue gas flows further to the second quenching segment 301 where cooling water 307 enters from inlet 310 into the straight tubes 306 and exits from outlet 311 in a direction opposite to that of the flue gas. Thus, the flue gas undergoes rapid heat exchange with water 307 in the straight tube 306 and is quickly cooled from a high temperature to lower than 200° C. within one second, thus eliminating the re-forming of dioxins. Water 307, after heat-exchange, is turned into steam and exits via outlet 311 and enters into the steam boiler for utilizing the thermal energy contained therein directly or converting it into other forms of energy.

The number and the length of the serpentuators 304 and the straight tubes 306 in the quenching barrel 301, and the flow rate of cooling mediums 305 and 307 can be adjusted based on the temperature and the flow rate of the high temperature flue gas exhausted from the incineration furnace 20 as monitored by the online monitoring system. If the high temperature flue gas has a higher temperature and a larger flow rate, the quenching barrel 301 is necessarily provided with more and longer serpentuators 304 and straight tubes 306 while the cooling mediums 305 and 307 in the serpentuators 304 and straight tubes 306 should have a higher flow rate. Thus, the high temperature flue gas can be cooled below the re-forming temperature of dioxins within one second, preventing re-forming of dioxins effectively.

According to the present invention, the quenching barrel is divided into two segments. The first quenching segment 301 is provided with serpentuators 304. Thus, heat exchange occurs in a large area between the high temperature flue gas and the cooling medium 305, oil or steam, contained in the serpentuators 304 in the first quenching segment to significantly decrease the temperature of the flue gas. The second quenching segment 301 is provided with straight tubes 306. Thus, the high temperature flue gas undergoes heat exchange with the cooling medium 307, water, contained in the straight tubes 306 to further decrease its temperature. Furthermore, the flue gas can passes the second quenching segment 301 at a higher rate to prevent re-forming of dioxins effectively.

The flue gas outlet of the flue gas quenching device 30 is connected to the gas inlet of the flue gas treating device 40. The treating device 40 has a gas-tight shell 401 provided with a partition wall 402 dividing the shell 401 chamber into a flue gas purification region 403 on the left and a liquid-gas separation region 404 on the right. A passage is provided above the partition wall 402 for conveying flue gas 405 between the flue gas purification region 403 and the liquid-gas separation region 404. A gas inlet is provided at the middle of the left wall of the shell 401 in the flue gas purification region 403. A gas flow baffle 4015 is provided on the shell 401 wall above the gas inlet and inclined in a down-right direction at an angle of 20°. A liquid inlet 4012 is provided on the left of the upper wall of the shell 401 in the flue gas purification region 403. A gas outlet is provided on the shell 401 in the liquid-gas separation region 404. A monitor 501 of an on-line monitoring system 50 is provided at the gas outlet 4013 for determining continuously whether the gas exhausted from the gas outlet meets the standards required by environmental protection regulations. A liquid outlet 4014 is provided on the bottom of the shell 401 in the liquid-gas separation region 404, three impellers 406 are positioned horizontally along a line on the upper wall of the shell 401 in the flue gas purification region 403. Each impeller 406 has six vanes 4061 in any structure as shown in FIGS. 9, 10, 11, and 12 with zigzag teeth 4062 unitary with the impeller 406 and a tooth height of 20 mm. A gas flow guide plate 407 is inclined in a down-right direction at an angle of 20° on the upper wall of shell 401. A purifying liquor 408 is provided in the shell 401 chamber below the impeller 406. The purifying liquor is water, a basic, or an acidic aqueous solution. An overflow passage 409 is located on the top of the partition wall 402. To ensure an effective contact between the impeller 406 and the purifying liquor 408, the liquor should be maintained at such a level that the purifying liquor 408 contacts 8 mm of the vane 4061. The flue gas exhausted from the quenching device 30 enters the flue gas purification region 403 via the gas inlet 4011 located in the middle of the left wall of the shell 401 in the flue gas purification region 403. The three impellers 406 are rotated anticlockwise by the gas flow affected by the gas flow baffle 4015 and the gas flow guide plate 407, bringing the vanes 4061 into effective contact with the purifying liquor 408 below the impeller 406. The impeller 406 rotates, promoting atomization of the purifying liquor 408 and thereby bring the flue gas into sufficient contact with the atomized purifying liquor; thus, the harmful and poisonous substances and dust contained in the flue gas are dissolved in the purifying liquor mist or washed out thoroughly by the purifying liquor to achieve timely removal of the harmful substances and dust from the flue gas. The zigzag teeth 4062 on the vanes 4061 reduce the resistance applied on the impeller 406 when it rotates. The gas flow passes the flue gas purification region 403 in the flow direction shown in FIG. 1. The flue gas is contacted with the atomized purifying liquor 408 sufficiently, and the washed flue gas enters, via the flue gas passage 405, the liquid-gas separation region 404, a larger volume space, with the result that the flow rate of the exhausted flue gas is abruptly reduced. Thus, the purifying liquor mist droplets containing harmful substances and dust settle to free the flue gas of the harmful substances and the dust thoroughly. In this way, the flue gas becomes free of environmental pollution and meets the requirements of environmental protection regulations before being exhausted. The settled purifying liquor mist droplets and the dust flow out of the liquid outlet 4014. The purifying liquor 408 shall be renewed duly according to the monitoring results and can be reused after further purification. The purified flue gas is exhausted via the gas outlet 4013. The purifying liquor 408 can be injected into the flue gas purification region 403 by a pump via the liquid inlet 4012 when it runs short in the chamber of the flue gas purification region 403. The purifying liquor 408 can also flow into the liquid-gas separation region 404 through the overflow passage 409 when excessive purifying liquor 408 exists in the chamber of the flue gas purification region 403, thus keeping an effective liquor level.

When liquid waste is to be treated, the device for feeding particulate waste 120 is replaced by the device for feeding liquid waste 110 as shown in FIG. 2. They both have a discharging outlet of the same profile. The device for feeding liquid waste 110 has a feed bin 111, a feeding inlet 113 and a discharging outlet 101 on the feed bin 111. A feeding component 114 is provided inside the feed bin 111, herein being a stirrer, and a gas feeder 112 is provided in the pipeline leading to the discharging outlet 101. The liquid waste is added to the feed bin 111 via the feeding inlet 113, and owing to the stirrer of the feeding component 114 and the gas feeder 112, passed through the discharging outlet 101, and then injected continuously into the hearth of the incineration furnace 20 via the feeding inlet of the incineration furnace.

When solid waste (such as solid chemical waste, medical waste) is to be treated, the device for feeding solid waste 130 as shown in FIG. 3 can be used as the continuous feeding device. The feeding device 130 has a discharging outlet 101, a circular impeller feeder 131 inside the discharging outlet which can rotate clockwise, a pneumatic propeller 132, a feeding inlet 133, and a belt conveyer 134. A feed baffle 135 is provided below the circular impeller feeder 131. The internal space at the discharging outlet 101 and the shape of the feed baffle 135 match with that of the circular impeller feeder 131 with a very small gap within 2-5 mm between them. The pneumatic propeller 132 is provided below the feed baffle 135. The circular impeller feeder 131, driven by an electric machine, rotates clockwise at a uniform speed. Thus, the solid waste is conveyed onto the vanes of the circular impeller feeder 131 continuously and uniformly by the belt conveyer 134. Then, the solid waste to be incinerated is conveyed to the inlet of the pneumatic propeller 132 through the vanes of the circular impeller feeder 131 and the feed baffle 135 when the circular impeller feeder 131 rotates clockwise and uniformly. The waste is subsequently injected into the furnace hearth by the high speed gas from the pneumatic propeller 132. The internal space at the discharging outlet 101 matches with the shape of the circular impeller feeder 131 with a very small gap between them, thus preventing the thermal energy inside the incineration furnace 20 from diffusing outward.

The second embodiment shown in the FIGS. 5 and 6 can also be used as the flue gas treating device. The middle part of the shell 401 in the flue gas purification region 403 assumes an arched shape. Three impellers 406 are arranged in an isosceles triangle formation on the upper part of the wall of the shell 401 in the flue gas purification region 403. The gas flow guide plate 407 is inclined downward to the right at an angle of 45° between the first and the second impellers 406. Another gas flow guide plate is inclined upward to the right at an angle of 45° between the second and the third impellers 406. The liquid inlet is provided on the arched part of the upper part of the wall of shell 401 in the flue gas purification region 403. The gas flow, affected by the gas flow baffle 4015 and the gas flow guide plate 407, drives the first and the second impellers 406 to rotate anticlockwise, and the third impeller 406 to rotate clockwise. Thus, the gas flow passes the flue gas purification region 403 in the flow direction shown in FIG. 5. The flue gas is contacted with the atomized purifying liquor 408 sufficiently and the washed flue gas enters, via the flue gas passage 405, the liquid-gas separation region 404, a larger volume space, with the result that the flow rate of the exhausted flue gas is abruptly reduced. Thus, the purifying liquor mist droplets containing harmful substances and dust settle to free the flue gas of the harmful substances and the dust thoroughly. In this way, the flue gas becomes freed of environmental pollution and meets the requirements of environmental protection regulations before exhausting. The settled purifying liquor mist droplets and the dust flow out of the liquid outlet 4014. The purifying liquor 408 shall be renewed duly according to the monitoring results and can be reused after further purification. The purified flue gas is exhausted via the gas outlet 4013. The purifying liquor 408 can be injected into the flue gas purification region 403 by a pump via the liquid inlet 4012 when it runs short in the chamber of the flue gas purification region 403. The purifying liquor 408 can also flow into the liquid-gas separation region 404 through overflow passage 409 when excessive purifying liquor 408 exists in the chamber of the flue gas purification region 403 to maintain an effective liquor level. The three impellers 406 according to the present embodiment are arranged in an isosceles triangle formation with shorter distances among each other. Thus, the flue gas treating device occupies less space with the structure being more compact.

The third embodiment shown in the FIGS. 7 and 8 can also be used as the flue gas treating device. Four impellers 406 on the wall of the shell 401 in the flue gas purification region 403 are displaced in a staggered way along two vertical lines. The gas inlet 4011 is located on the bottom of the left wall of the shell 401 in the flue gas purification region 403. The gas flow baffle 4015 is located below the gas inlet, while a gas flow guide plate 407 is provided below each impeller 406°. Both the baffle 4015 and the guide plate 407 are inclined upward at an angle of 70. Both sides of the gas flow guide plate 407 are fixed to the wall of the shell 401. The bottom of the gas flow guide plate 407 below the impeller 406 near the left wall of the shell 401 is fixed on the left wall of the shell 401. The bottom of the gas flow guide plate 407 below the impeller 406 near the partition wall 402 is fixed on the partition wall 402. A liquid inlet 4012 is located on the upper left wall of the shell 401 in the flue gas purification region 403. A gas outlet is located in the lower part of the liquid-gas separation region 404. A monitor 501 of the online monitoring system 50 is installed at the gas outlet to determine continuously whether the gas exhausted from the gas outlet meets the standards required by environmental protection regulations. An arched covering plate 4016 is provided above the gas outlet 4013. An overflow passage 409 is located below the partition wall 402. The liquid outlet 4014 is located on the shell 401 at the bottom of the overflow passage 409. After it enters the flue gas purification region 403 via the gas inlet, the flue gas, affected by the gas flow baffle 4015 and the gas flow guide plate 407, drives the impellers 406 near the partition wall 402 to rotate clockwise, and the impellers 406 near the left wall of the shell 401 to rotate anticlockwise. Thus, the gas flow passes the flue gas purification region 403 in the flow direction shown in FIG. 7. The purifying liquor 408 is injected into the flue gas purification region 403 via the liquid inlet 4012 and owing to the rotation of the impellers 406, accumulates in the chamber between the gas flow guide plate 407 and the left wall of shell 401 or between the gas flow guide plate 407 and the partition wall 402 below the impeller 406. The impeller 406 rotates to promote atomization of the purifying liquor 408 and thereby bring the flue gas into sufficient contact with the atomized purifying liquor 408. The washed flue gas enters, via the flue gas passage 405, the liquid-gas separation region 404, a larger volume space, with the result that the flow rate of the exhausted flue gas is abruptly reduced. Thus, the purifying liquor mist droplets containing harmful substances and dust settle to free the flue gas of the harmful substances and the dust thoroughly. In this way, the flue gas becomes freed of environmental pollution and meets the requirements of environmental protection regulations before being exhausted. The settled purifying liquor mist droplets and the dust flow out of the liquid outlet 4014. The purifying liquor 408 shall be renewed duly according to the monitoring results and can be reused after further purification. The purified flue gas is exhausted via the gas outlet. The settled purifying liquor 408 is held back by the plate 4016 above the gas outlet and falls along the sides of the outlet. Thus, the purifying liquor 408 is prevented from being pushed out by the gas flow at the gas outlet. The purifying liquor 408 can be injected into the flue gas purification region 403 by a pump via the liquid inlet 4012 when it runs short below the impeller 406. The purifying liquor 408 can also overflow from the opening of the gas flow guide plate 407, and passes through the overflow passage 409, then flows into the settled purifying liquid 408 in the liquid-gas separation region 404, and finally exits via the liquid outlet 4014 when excessive purifying liquor 408 exists, thus maintaining an effective liquor level. In such a structure, the four impellers 406 are displaced vertically. Thus, the flue gas treating device occupies less space with the structure being more compact.

Having described our invention, I claim:

1. Apparatus for incinerating dangerous waste, comprising:

a continuous feeding device;

an incineration furnace;

a flue gas quenching device;

a flue gas treating device; and an online monitoring system;

wherein the continuous feeding device having a discharging outlet;

the incineration furnace having a furnace body;

the furnace body being provided with a feeding inlet and a flue gas outlet;

the discharging outlet of the continuous feeding device being connected to the feeding inlet of the incineration furnace;

the flue gas quenching device having a flue gas inlet and a flue gas outlet;

the flue gas outlet of the incineration furnace being connected to the flue gas inlet of the flue gas quenching device;

the flue gas treating device having a gas inlet and a gas outlet;

the flue gas outlet of the quenching device being connected to the gas inlet of the flue gas treating device; and the gas outlet of the treating device being provided with a monitor of the online monitoring system;

wherein said continuous feeding device can be a device for feeding liquid waste, particulate waste, and solid waste; and wherein said device for feeding solid residue has a discharging outlet, a circular impeller feeder capable of rotating clockwise, a pneumatic propeller, a feeding inlet, and a belt conveyer, the circular impeller feeder being provided inside the discharging outlet; below the circular impeller feeder being provided a feed baffle, and a pneumatic propeller below the feed baffle; the internal space of the discharging outlet and the shape of the feed baffle matching that of the circular impeller feeder; the pneumatic propeller being provided below the feed baffle; and a feeding terrace being provided against the internal furnace wall at both the feeding inlet and the inlet of the pneumatic propeller.

2. The apparatus according to claim 1, wherein said device for feeding liquid waste has a feed bin with a feeding inlet and a discharging outlet; inside the feed bin is provided a feeding component, and an gas compressor is provided in the pipeline to the discharging outlet.

3. The apparatus according to claim 1, wherein said device for feeding particulate residue has a pipeline with a discharging outlet provided at one end and the other end connected to an gas-feeding component; above the pipeline is provided a feeding hopper with a feeding component therein; the feeding hopper being connected to the pipeline.

4. The apparatus according to claim 1, wherein said dangerous waste are selected from the group consisting of liquid waste, solid waste or particulate waste.

5. Apparatus for incinerating dangerous waste, comprising:
    a continuous feeding device;
    an incineration furnace;
    a flue gas quenching device;
    a flue gas treating device; and
    an online monitoring system;
        wherein the continuous feeding device having a discharging outlet;
        the incineration furnace having a furnace body;
        the furnace body being provided with a feeding inlet and a flue gas outlet;
        the discharging outlet of the continuous feeding device being connected to the feeding inlet of the incineration furnace;
        the flue gas quenching device having a flue gas inlet and a flue gas outlet;
        the flue gas outlet of the incineration furnace being connected to the flue gas inlet of the flue gas quenching device;
        the flue gas treating device having a gas inlet and a gas outlet;
        the flue gas outlet of the quenching device being connected to the gas inlet of the flue gas treating device; and
        the gas outlet of the treating device being provided with a monitor of the online monitoring system;
        wherein said incineration furnace has a furnace body, and in said furnace body are provided a vertically displaced partition wall dividing the furnace hearth into a combustion region and a ventilation region, a passage above the partition wall between the combustion region and the ventilation region, flue gas guiding means consisting of components horizontally extending from the partition wall on the combustion region side and the internal wall of the furnace body and vertically staggered relative to each other, an upper and a lower component extending from the partition wall, and a middle component extending from the internal wall of the furnace body, a feeding inlet below the flue gas guiding means in the furnace body, a flue gas outlet in the ventilation region of the furnace body, an induced draft fan above the flue gas outlet, a movable grate below the combustion region, and an gas inlet below the movable grate in the lower portion of the furnace body; and an automatic ash-purging device consisting of belt pulley wheel mechanisms is provided on the bottom of incineration furnace.

6. The apparatus according to claim 5, wherein at least one oil spout is provided above the feeding inlet, above or below the flue gas guiding means; the oil spout being inclined downward.

7. The apparatus according to claim 5, wherein the flue gas guiding means assumes an arc shape with the radian being 10-80°.

8. The apparatus according to claim 1, wherein said flue gas quenching device has a quenching barrel with a flue gas inlet at one end and a flue gas outlet at the other end, the quenching barrel being divided into a first quenching segment having at least two serpentuators containing cooling medium provided in parallel, and the second quenching segment having at least two straight tubes containing cooling medium provided in parallel; in the first quenching segment, the serpentuator being provided with an inlet and an outlet for the cooling medium, with the outlet connected to a thermal oil tank or a steam boiler; in the second quenching segment, the straight tube being provided with an inlet and an outlet for the cooling medium, with the outlet connected to the steam boiler.

9. A process for treating and comprehensively utilizing waste, comprising combusting the waste sufficiently using the device according to claim 5, recovering the thermal energy from the high temperature flue gas or converting it into other useful energy resources, and recovering the metal oxides or noble metals from the treated flue gas and/or sinters.

10. Apparatus for incinerating dangerous waste, comprising:
    a continuous feeding device;
    an incineration furnace;
    a flue gas quenching device;
    a flue gas treating device; and
    an online monitoring system;
        wherein the continuous feeding device having a discharging outlet;
        the incineration furnace having a furnace body;
        the furnace body being provided with a feeding inlet and a flue gas outlet;
        the discharging outlet of the continuous feeding device being connected to the feeding inlet of the incineration furnace;
        the flue gas quenching device having a flue gas inlet and a flue gas outlet;
        the flue gas outlet of the incineration furnace being connected to the flue gas inlet of the flue gas quenching device;
        the flue gas treating device having a gas inlet and a gas outlet;
        the flue gas outlet of the quenching device being connected to the gas inlet of the flue gas treating device; and
        the gas outlet of the treating device being provided with a monitor of the online monitoring system;
        wherein said flue treating device has an gas-tight shell; in said gas-tight shell are provided a partition wall dividing the shell chamber into a flue gas purification region and a liquid-gas separation region, a passage above the partition wall for conveying flue gas between the flue gas purification region and the liquid-gas separation region, a gas inlet and a liquid inlet on the shell in the flue gas purification region, a gas outlet on the shell in the liquid-gas separation region, a liquid outlet on the bottom of the shell, a gas flow baffle at the gas inlet on the internal wall of the shell, an impeller and a gas flow guide plate positioned in the flue gas purification region, and an overflow passage between the flue gas purification region and the liquid-gas separation region; the gas flow guide plate and the gas flow baffle are both being disposed displaced in an inclined manner with the inclination direction coinciding with the gas flow direction and the inclination angle being 10°-80°; the number of the impeller is not less than one and purifying liquor is provided below the impeller, said purifying liquor being water, a basic solution, or an acidic solution; the purifying liquor contacts 1-200 mm of the vane of the impeller.

11. The apparatus according to claim 10, wherein the impeller has a vane and the number of the vanes on each impeller is not less than one.

12. The apparatus according to claim 10, wherein the vane is provided with teeth, which are preferably selected from the group consisting of zigzag, triangular or trapezoidal teeth unitary with the vane, and are also preferably selected from the group consisting of threads and plastic ropes fixed on the vane; with the tooth height being 1-200 mm.

13. The apparatus according to claim 8, wherein said gas outlet is located on the upper shell in the liquid-gas separation region.

14. The apparatus according to claim 8, wherein said gas outlet is located in the lower shell in the liquid-gas separation region and an arched covering plate is provided above the outlet.

15. A process for treating and comprehensively utilizing waste, comprising combusting the waste sufficiently using the device according to claim 10, recovering the thermal energy from the high temperature flue gas or converting it into other useful energy resources, and recovering the metal oxides or noble metals from the treated flue gas and/or sinters.

16. The process according to claim 15, wherein said dangerous waste are selected from the group consisting of liquid waste, solid waste or particulate waste.

17. A process for treating and comprehensively utilizing waste, comprising combusting the waste sufficiently using the device according to claim 1, recovering the thermal energy from the high temperature flue gas or converting it into other useful energy resources, and recovering the metal oxides or noble metals from the treated flue gas and/or sinters.

18. The process according to claim 17, wherein said dangerous waste are selected from the group consisting of liquid waste, solid waste or particulate waste.

19. The process according to claim 9, wherein said dangerous waste are selected from the group consisting of liquid waste, solid waste or particulate waste.

* * * * *